A. GODFREY.
Hay Loader.
No. 69,794. Patented Oct. 15, 1867.
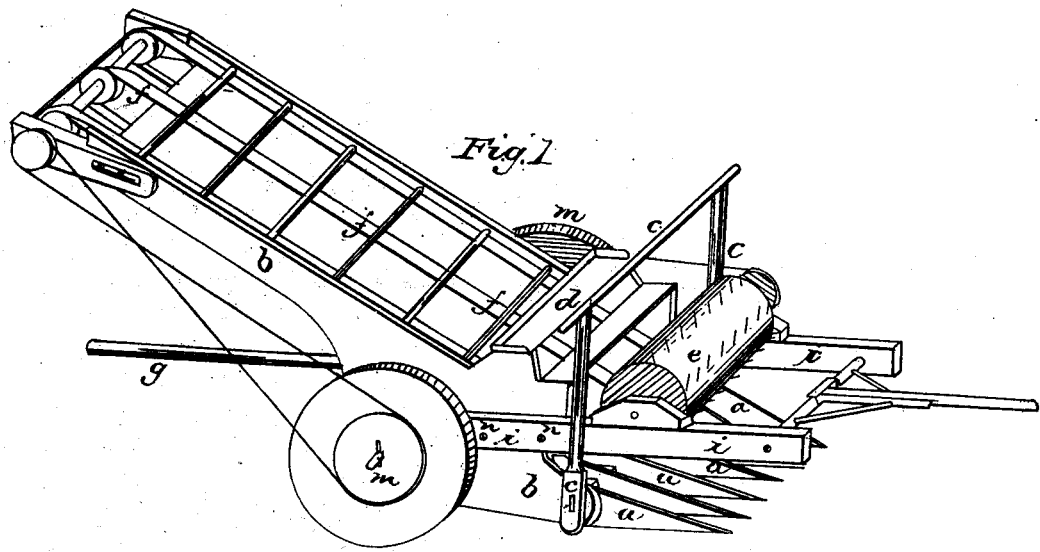
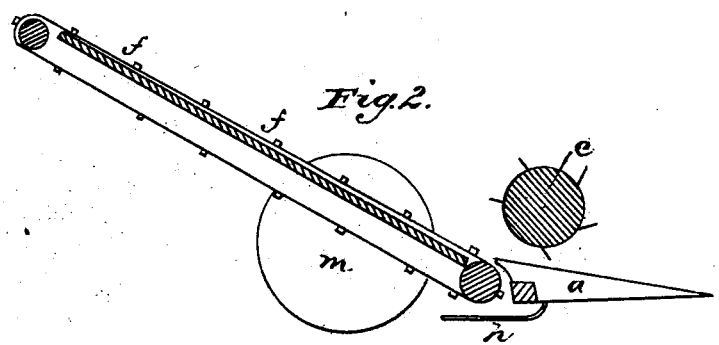
Witnesses.
Thos. H. Hutchins
Samuel Wilson
Inventor
Austin Godfrey

United States Patent Office.

AUSTIN GODFREY, OF DUPAGE, ILLINOIS.

Letters Patent No. 69,794, dated October 15, 1867.

IMPROVEMENT IN HAY-RAKERS AND LOADERS.

The Schedule referred to in these Letters Patent and making part of the same.

Be it known that I, AUSTIN GODFREY, of the town of Dupage, in Will county, and State of Illinois, have invented a new and useful Improvement on a Hay-Loader; and I do hereby declare the following to be a full, clear, and exact description of the construction and operation of the same, reference being had to the annexed drawings making part of this specification, in which—

Figure 1 is a perspective view, and
Figure 2 a sectional view.

In fig. 1, $a\,a\,a$ represent an adjustable rake, the head of which is hinged into the main frame $b$, and operated by means of the bar and handles $c\,c\,c$ by the operator, who rides on the seat $d$, the object of which is to raise the ends of the teeth to pass over obstructions. Resting on the frame $i$ over the rake is a revolving cylinder, $e$, with teeth inclined a little back, so as not to catch the hay as it revolves, throwing it off the rake back on the elevator $f\,f\,f$, from which it falls on to the wagon. The machine is intended to precede the wagon, which is attached to the reach $g$, the end of the tongue passing through a ring on the axle of the machine. Fig. 2 shows the relative positions of the several parts. $h$ shows a shoe or plate attached as shown, for the protection of the rake and the elevator pulley. I am aware of the previous use of a cylinder similar, but never in the particular manner set forth.

The principal advantages I claim to have obtained in this machine are, first, it rakes and gathers up the hay directly in front from the windrow, saving a side draught, and obviating the necessity of discharging the hay from one side of the elevator into the wagon; second, the adjustable rake constructed and operating as shown, being entirely under the control of the operator. $i$ represents a frame fastened to the main frame $b$ by bolts at $n\,n$, so arranged to raise or lower that part of the machine forward of the axle, as to pass from place to place, or to furnish greater facilities for passing over obstructions, and also to govern the distance between the rake $a\,a\,a$ and the cylinder $e$. The whole machine is intended to be nearly evenly balanced on the axle of the travelling wheels $m\,m$, the heaviest part being at the rake end.

Claims.

What I claim as new in my invention, and desire to secure by Letters Patent, is—

1. The adjustable rake $a\,a\,a$, in combination with the shoe $h$.

2. I claim the revolving cylinder $e$, in combination with the adjustable rake $a\,a\,a$, shoe $h$, and elevator $f\,f\,f$, when constructed and operating in the particular manner and for the purposes set forth.

3. I claim the frame $i$, with its fastenings to the main frame $b$ as set forth, in combination with the cylinder $e$ and rake $a\,a\,a$, and reach or fastener $g$, when constructed and operating conjointly in the particular manner set forth.

AUSTIN GODFREY.

Witnesses:
 THOS. H. HUTCHINS,
 SAMUEL WILSON.